(12) United States Patent
Morishima et al.

(10) Patent No.: US 9,083,056 B2
(45) Date of Patent: Jul. 14, 2015

(54) METHOD FOR MANUFACTURING NONAQUEOUS SECONDARY BATTERY ELECTRODE

(75) Inventors: Ryuta Morishima, Nagoya (JP); Hitoshi Sakai, Nagoya (JP); Hiroaki Ikeda, Toyota (JP); Hiroyuki Akita, Seto (JP); Hidehito Matsuo, Owariasahi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 866 days.

(21) Appl. No.: 13/139,319

(22) PCT Filed: Dec. 11, 2009

(86) PCT No.: PCT/JP2009/070778
§ 371 (c)(1),
(2), (4) Date: Jun. 13, 2011

(87) PCT Pub. No.: WO2010/073924
PCT Pub. Date: Jul. 1, 2010

(65) Prior Publication Data
US 2011/0239446 A1  Oct. 6, 2011

(30) Foreign Application Priority Data
Dec. 26, 2008  (JP) .................................. 2008-333156

(51) Int. Cl.
*H01M 4/133* (2010.01)
*H01M 10/0525* (2010.01)
(Continued)

(52) U.S. Cl.
CPC ........ *H01M 10/0525* (2013.01); *H01M 4/0404* (2013.01); *H01M 4/131* (2013.01);
(Continued)

(58) Field of Classification Search
CPC .... H01M 4/133; H01M 4/139; H01M 4/1393
USPC ......................................................... 29/623.1
See application file for complete search history.

(56) References Cited

U.S. PATENT DOCUMENTS

| 2002/0114993 | A1* | 8/2002 | Miyaki et al. ................. 429/137 |
| 2005/0158623 | A1* | 7/2005 | Matsui et al. ................. 429/200 |

(Continued)

FOREIGN PATENT DOCUMENTS

| JP | 7-220759 | 8/1995 |
| JP | 9-320590 | 12/1997 |

(Continued)

OTHER PUBLICATIONS

International Search Report in International Application No. PCT/JP2009/070778; Mailing Date: Mar. 9, 2010.

*Primary Examiner* — Ula C Ruddock
*Assistant Examiner* — Frank Chernow
(74) *Attorney, Agent, or Firm* — Finnegan, Henderson, Farabow, Garrett & Dunner, LLP (57) ABSTRACT

A method is provided for manufacturing an electrode that has a porous inorganic layer on the surface of an active material layer and is suitable for constructing a nonaqueous secondary battery with excellent input-output performance. In this manufacturing method, an electrode perform, which has an active material layer (344) consisting primarily of active material particles (42) and supported on a collector (342), is prepared. The water concentration of at least the surface (344a) of the active material layer (344) is adjusted to 100 ppm to 500 ppm. A slurry (S) containing inorganic particles (44), a binder and an organic solvent is coated on the surface (344a) of the active material layer with the water concentration thus adjusted, to form a porous inorganic layer.

19 Claims, 5 Drawing Sheets (51) Int. Cl.
*H01M 4/04* (2006.01)
*H01M 4/131* (2010.01)
*H01M 4/1393* (2010.01)
*H01M 4/587* (2010.01)
*H01M 4/62* (2006.01)
*H01M 4/75* (2006.01)
*H01M 4/505* (2010.01)
*H01M 4/525* (2010.01)

(52) U.S. Cl.
CPC ........... *H01M 4/133* (2013.01); *H01M 4/1393* (2013.01); *H01M 4/587* (2013.01); *H01M 4/621* (2013.01); *H01M 4/75* (2013.01); *H01M 4/505* (2013.01); *H01M 4/525* (2013.01); *Y02E 60/122* (2013.01); *Y02T 10/7011* (2013.01); *Y10T 29/49108* (2013.01); *Y10T 29/49115* (2013.01)

(56) References Cited

U.S. PATENT DOCUMENTS

| | | |
|---|---|---|
| 2008/0143337 A1* | 6/2008 | Fujikawa et al. ............. 324/426 |
| 2010/0035140 A1 | 2/2010 | Miyahisa et al. |
| 2010/0136394 A1 | 6/2010 | Miyahisa et al. |

FOREIGN PATENT DOCUMENTS

| | | |
|---|---|---|
| JP | 2003-132889 | 5/2003 |
| JP | 2004-134244 | 4/2004 |
| JP | 2005-310764 | 11/2005 |
| JP | 2006-228439 | 8/2006 |
| JP | 2007-103066 | 4/2007 |
| JP | 2009-43718 | 2/2009 |
| JP | 2009-49006 | 3/2009 |
| JP | 2009-164014 | 7/2009 |

\* cited by examiner

METHOD FOR MANUFACTURING NONAQUEOUS SECONDARY BATTERY ELECTRODE

TECHNICAL FIELD

The present invention relates to an electrode suitable as a component of a nonaqueous secondary battery (lithium-ion battery or the like), and to a battery using this electrode.

This application is a national phase application of International Application No. PCT/JP2009/070778, filed Dec. 11, 2009, and claims priority of Japanese Patent Application No. 2008-333156filed on Dec. 26, 2008, the entire contents of both of which are incorporated herein by reference.

BACKGROUND ART

Lithium secondary batteries and other nonaqueous secondary batteries are in increasing demand as power sources in vehicles using electricity as the drive source, and as power sources in personal computers, handheld devices and other electrical products and the like. Lithium-ion batteries hold particular promise as high-output vehicle-mounted power sources because they provide high energy densities with low weight. Patent Documents 1 through 6 are examples of documents of prior art in the field of nonaqueous secondary batteries.

Patent Document 1: Japanese Patent Application Laid-open No. 7-220759
Patent Document 2: Japanese Patent Application Laid-open No. 2004-134244
Patent Document 3: Japanese Patent Application Laid-open No. 2003-132889
Patent Document 4: Japanese Patent Application Laid-open No. 119-320590
Patent Document 5: Japanese Patent Application Laid-open No. 2005-310764
Patent Document 6: Japanese Patent Application Laid-open No. 2007-103066

Typical electrodes (positive and negative electrodes) in lithium-ion batteries are composed of a layer (active material layer) that consists primarily of a material (active material) capable of reversibly storing and releasing lithium ions, and that is supported on a collector. A preferred method of forming this active material layer is to disperse or dissolve the active material in powder form (active material powder) in a suitable solvent to prepare a paste or slurry composition (active material layer-forming composition) that is then applied to a collector, dried, and then pressed as necessary.

Providing a porous layer consisting primarily of inorganic particles on the surface of the active material layer is an effective means of increasing the reliability of lithium-ion batteries and other batteries (by preventing internal short-circuits and the like). From the standpoint of productivity and the like, this porous inorganic layer can be preferably be formed by dispersing the inorganic particles in a liquid medium comprising a binder dissolved in a suitable solvent to form a paste or slurry composition (coating agent), which is then coated on the surface of the active material layer. Patent Document 1 describes a nonaqueous electrolyte secondary battery wherein a porous protective film consisting of a resin binder and solid particles is formed on the surface of the active material layer. The porous protective film can be formed by coating a fine-particle slurry consisting of fine particles dispersed in a solvent together with a binder.

When such a coating agent is coated on the surface of the active material layer, at least some of the liquid medium seeps into the active material layer. The binder contained in the liquid medium covers the surface of the active material particles, which can detract from the input-output performance of the battery. Forming the inorganic layer in such a way as to control this loss of input-output performance is particularly significant in the case of batteries for vehicular power sources, which require high input-output performance.

DISCLOSURE OF THE INVENTION

It is an object of the present invention to provide a method for efficiently manufacturing an electrode that has a porous inorganic layer on the surface of an active material layer and is suitable for constructing a nonaqueous secondary battery with low input-output resistance (that is, with excellent input-output performance). It is another object of the present invention to provide a nonaqueous secondary battery (such as a lithium-ion battery) using this electrode.

The present invention provides a method for manufacturing a nonaqueous secondary battery electrode having a porous inorganic layer on an active material layer. This method comprises preparing an electrode preform that has an active material layer consisting primarily of active material particles and supported on a collector. It also comprises adjusting a water concentration of the active material layer so that a water concentration of at least the surface of the active material layer is 100 ppm to 500 ppm. It also comprises coating a slurry containing inorganic particles, a binder and an organic solvent on the surface of the active material layer with the water concentration thus adjusted, to form a porous inorganic layer.

In this method, the degree of seepage into the active material layer of the solvent in the slurry and the binder dissolved in the solvent can be controlled by means of water that has been deliberately included in at least the surface of the active material layer. The effect of porous inorganic layer formation on the input-output performance can thus be reduced by controlling excessive seepage of the binder into the active material layer. By keeping the water concentration of the surface of the active material layer within this range, it is also possible to form an inorganic layer having good adhesiveness with the active material layer (which can be evaluated in terms of 90° peeling strength as described below). An electrode manufactured by this method can provide a highly reliable, high-performance (such as excellent input-output performance) battery when used as a component of a nonaqueous secondary battery.

In this Description, the term "secondary battery" indicates a storage device that can be repeatedly charged and discharged, and encompasses lithium secondary batteries and other so-called storage batteries as well as electrical double-layer capacitors and other storage elements. A "nonaqueous secondary battery" is a battery provided with a nonaqueous electrolyte (typically, an electrolyte containing a supporting salt (supporting electrolyte) in a nonaqueous solvent). A "lithium secondary battery" is a secondary battery that uses lithium ions as the electrolyte ions, and is charged and discharged by movement of lithium ions between the positive and negative electrodes. Those secondary batteries commonly called lithium-ion batteries are typical examples of lithium secondary batteries in this Description.

Preferred examples of the organic solvent in the aforementioned slurry (that is, the inorganic particle dispersion for forming the porous inorganic layer, sometimes called the coating agent) include amide solvents (such as N-methyl-2-pyrrolidone). Preferred examples of the aforementioned binder include acrylic binders. A coating agent of this composition makes it easier to control seepage of the binder into the active material layer by means of the water on the active material layer surface. Alumina particles and various other ceramic particles can be used by preference as the inorganic particles. In is particularly desirable to use alumina particles (typically α-alumina particles).

The method disclosed herein can be applied favorably to the manufacture of an electrode provided with an active material layer in which the active material particles are carbon particles (that is, an active material layer consisting primarily of carbon particles). An electrode provided with such an active material layer can be used favorably for example as the negative electrode of a lithium-ion battery. Thus, another aspect of the present invention provides a method for manufacturing a lithium-ion battery negative electrode.

The method disclosed herein can preferably be implemented in a mode in which the surface of the active material particles located in a surface part of the active material layer are treated in advance to introduce hydrophilic functional groups before the water concentration is adjusted. This mode is suited to elevating the surface water concentration of the active material layer above the internal concentration when adjusting the water concentration. If water is thus distributed preferentially on the surface of the active material layer when the coating agent is applied, the amount of water retained by the active material layer as a whole can be reduced while still preventing excess seepage of the binder. Treatment including an operation of bringing a lower alcohol into contact with the surface part of the active material layer for example can be adopted by preference as the treatment to introduce hydrophilic functional groups.

The water concentration of the active material layer can preferably be adjusted by means of an operation that includes retaining the active material layer in an environment of dewpoint −10° C. or more (typically −10° C. to +10° C.) for example. At least the surface of an active material layer with a low water concentration can be made to contain water at the target concentration by preparing an electrode preform having an active material layer at least the surface (typically the surface and interior) of which has a water concentration lower than the target value, and then retaining the electrode preform in the environment described above. The aforementioned treatment to introduce hydrophilic functional groups is also advantageous from the standpoint of improving electrode productivity by shortening the time required to make an active material layer with a low water concentration contain the desired amount of water.

The present invention also provides a lithium-ion battery manufacturing method wherein a lithium-ion battery is constructed using an electrode manufactured by any of the methods disclosed herein. A more reliable and higher-performance (input-output performance for example) battery can be manufactured by this method. Such a lithium-ion battery is suitable as a power source for a motor mounted in an automobile or other vehicle for example.

BEST MODE FOR CARRYING OUT THE INVENTION

Favorable embodiments of the present invention are explained below. Matters that are necessary for implementing the present invention and that are not especially mentioned in this Description can be understood as design matters by a person skilled in the art based on prior art in the field. The present invention can be implemented based on the content disclosed in this Description and on technical common knowledge in the field.

The techniques disclosed herein can be applied broadly to nonaqueous secondary battery electrodes (such as lithium secondary battery negative electrodes) comprising an active material layer and a porous inorganic layer covering the active material layer, both supported on a collector, to the manufacture of such electrodes, to batteries equipped with such electrodes, to the manufacture of such batteries, and to vehicles equipped with such batteries. The present invention is explained in more detail below mainly as it relates to a lithium-ion battery electrode (typically a negative electrode) and a lithium-ion battery equipped with that electrode, but this does not mean that application of the present invention is limited to such an electrode or battery.

A member consisting primarily of a conductive metal such as copper, nickel, aluminum, titanium, stainless steel or the like can be used as the collector supporting the active material layer. A copper collector or one made of an alloy consisting primarily of copper (copper alloy) can be preferably be used as a component of a lithium-ion battery negative electrode, while an aluminum collector or one made of an alloy consisting primarily of aluminum (aluminum alloy) can preferably be used as a component of a lithium-ion battery positive electrode. The shape of the collector is not particularly limited and will differ according to the shape and the like of the battery constructed using the resulting electrode, and a variety of forms are possible including bar, plate, sheet, foil, mesh and the like. The techniques disclosed herein can be applied favorably to the manufacture of an electrode using a sheet collector for example. A preferred mode of a battery constructed using such an electrode (electrode sheet) is a battery provided with an electrode body consisting of a positive electrode and negative electrode wound together, typically with a sheet-shaped separator between the two (wound electrode assembly). The outer shape of this battery is not particularly limited, and can be rectangular, flat, cylindrical or the like. The thickness and size of the collector sheet are not particularly limited, and can be selected appropriately according to the shape and the like of the lithium-ion battery. For example, a collector sheet about 5 µm to 30 µm thick can be used. The collector can be about 2 cm to 15 cm wide, and about 5 cm to 1000 cm long.

The lithium-ion battery negative electrode disclosed herein is provided with an active material layer (negative electrode active material layer) consisting primarily of active material particles made of a material capable of storing and releasing lithium ions. The negative electrode active material particles can be selected appropriately from a variety of particulate materials known to function as negative electrode active materials in ordinary lithium-ion batteries. Carbon particles are an example of preferred active material particles. It is desirable to use a particulate carbon material (carbon particles) at least part of which has a graphite structure (layered structure). A graphite carbon material, non-graphitizable carbon (hard carbon) material, graphitizable carbon (soft carbon) material or a material having a combination of these structures can be used favorably. For example, natural graphite, mesocarbon microbeads (MCMB), highly oriented pyrolytic graphite (HOPG) or the like can be used.

Particles with an average particle size of about 5 μm to 50 μm can be used by preference as the negative electrode active material particles. Of these, carbon particles with an average particle size of about 5 μm to 15 μm (such as about 8 μm to 12 μm) are preferred. Such relatively small carbon particles may be a suitable active material for rapid charge and discharge (such as high-output discharge) because they have a large surface area per unit volume. Consequently, a lithium-ion battery having this active material can be used favorably as a vehicle-mounted lithium-ion battery. Moreover, such relatively small carbon particles are more effective at buffering (absorbing) volume fluctuation of the active material layer as a whole because the individual carbon particles undergo less volume fluctuation from charge and discharge than do larger particles. This is useful from the standpoint of durability (preventing peeling and the like) of the porous inorganic layer formed atop the active material layer.

In addition to the negative electrode active material particles, the negative electrode active material layer may also contain as necessary one or two or more materials that can ordinarily be compounded with the negative electrode active material layers of lithium-ion batteries. Examples of such materials include various polymer materials that function as binders. For example, when the active material layer is formed using a water-based aqueous composition (a composition using water or a mixed solvent composed primarily of water as the dispersion solvent for the active material particles), a polymer material that dissolves or disperses in water can be used by preference as the binder. Examples of polymer materials that dissolve in water (are water-soluble) include carboxymethyl cellulose (CMC), methylcellulose (MC), cellulose acetate phthalate (CAP), hydroxypropyl methylcellulose (HPMC), hydroxypropyl methylcellulose phthalate (HPMCP) and other cellulose polymers; and polyvinyl alcohol (PVA) and the like. Examples of polymer materials that disperse in water (are water-dispersible) include polytetrafluoroethylene (PTFE), tetrafluoroethylene-perfluoroalkyl vinyl ether copolymer (PFA), tetrafluoroethylene-hexafluoropropylene copolymer (FEP), ethylene-tetrafluoroethylene copolymer (ETFE) and other fluorine resins; vinyl acetate copolymers; styrene butadiene rubber (SBR), acrylic acid-modified SBR resin (SBR latex), gum arabic and other rubbers and the like. When the active material layer is formed using a solvent-based liquid composition (a composition in which the dispersal medium for the active material particles consists primarily of an organic solvent), polyvinylidene fluoride (PVDF), polyvinylidene chloride (PVDC), polyethylene oxide PEO), polypropylene oxide (PPO), polyethylene oxide-propylene oxide copolymer (PEO-PPO) and other polymer materials can be used. In addition to being used as binders, the polymer materials given as examples above can be used as thickeners and other additives in the negative electrode active material layer-forming composition.

The negative electrode active material layer can preferably be prepared for example by applying a liquid composition of the active material particles dispersed in a suitable solvent (typically, a paste or slurry of negative electrode active material layer-forming composition) to a collector, and drying the composition. Water, an organic solvent or a mixed solvent of these can be used as the solvent. For example, a water-based solvent (water or a mixed solvent composed primarily of water) can be adopted by preference. In addition to the negative electrode active material particles and solvent, this composition may also as necessary contain one or two or more materials that can ordinarily be compounded with liquid compositions for forming negative electrode active material compositions when manufacturing lithium-ion battery electrodes. For example, a negative electrode active material layer-forming composition containing a polymer material (binder) such as those described above can be used by preference.

The solids concentration (non-volatile component, i.e. the mass percentage of the negative electrode active material layer-forming components as a percentage of the composition as a whole) of the composition is not particularly limited, but can be about 40% to 60% for example. The mass percentage of the negative electrode active material particles in the solids (negative electrode active material layer-forming components) can be 85% or more (typically about 85% to 99.9%) for example, and is preferably about 90% to 99% or more preferably about 95% to 99%.

Techniques similar to those of conventional known methods can be adopted for applying the composition to the negative electrode collector. For example, a specific amount of the composition can be coated on the surface of the collector using a suitable coating device (gravure coater, slit coater, die coater, comma coater or the like). The coated amount of the negative electrode active material layer-forming composition is not particularly limited, and may differ according the shapes, target properties and the like of the negative electrode sheet and battery. For example, the composition can be coated on both sides of a sheet collector so as to obtain a total coat volume as solids (dry mass) of about 5 to 20 mg/cm$^2$ for both sides.

After coating, the coated material can be dried by a suitable drying method and pressed as necessary to form the negative electrode active material layer on the surface of the negative electrode collector. The density of the negative electrode active material layer is not particularly limited, but may be 1.1 to 1.5 g/cm$^3$. The density of the negative electrode active material layer can also be about 1.1 to 1.3 g/cm$^3$. The pressing conditions may be set such that a negative electrode active material layer having the above-described density is formed. Various known, conventional press method such as roll pressing, flat plate pressing and the like can be adopted appropriately as the pressing method.

An electrode provided by the techniques disclosed herein is configured with a porous inorganic layer on the active material layer. This inorganic layer typically contains non-conductive (insulating) inorganic particles as a principal component (constituting 50 mass % or more of the inorganic layer). The inorganic material making up the inorganic particles can be an oxide, carbide, silicide, nitride or the like of a metal element or non-metal element. From the standpoint of chemical stability, raw material cost and the like, alumina ($Al_2O_3$), silica ($SiO_2$), zirconia ($ZrO_2$), magnesia (MgO) and other oxide particles can be used by preference. Silicon carbide (SiC) and other silicide particles and aluminum nitride (AlN) and other nitride particles can also be used. Alumina particles are an example of desirable inorganic particles. Of these, α-alumina particles are preferred. These α-alumina particles may be particles formed from multiple linked primary particles. Such linked particles can be manufactured based on technical common knowledge in the field, or can be obtained as a commercial product.

The average particle size of the inorganic particles can be about 0.1 μm to 15 μm for example. The volume-based average particle size ($D_{50}$) as measured with an ordinary commercial particle size meter (laser particle size distribution analyzer or the like) can be adopted as a measure of average particle size. It is normally desirable to use inorganic particles with an average particle size of about 0.2 μm to 1.5 μm (such as 0.5 μm to 1 μm). The effects produced by application of the present invention may be more evident in a mode using inorganic particles of this average particle size. Moreover, an electrode (such as a negative electrode) configured with such an inorganic layer on the active material layer may be suited to constructing a nonaqueous secondary battery (such as a lithium secondary battery, typically a lithium-ion battery) with improved battery performance.

In addition to the inorganic particles, a porous inorganic layer in the techniques disclosed herein contains a binder for binding the inorganic particles. A polymer that disperses or dissolves in the organic solvent contained in the slurry used to form the inorganic layer (inorganic particle dispersal solvent) can be used by preference as this binder. Examples include acrylonitrile-butadiene copolymer rubber (NBR), acrylonitrile-isoprene copolymer rubber (NIR), acrylonitrile-butadiene-isoprene copolymer rubber (NBIR) and other rubbers containing acrylonitrile as a copolymer component; acrylic acid, methacrylic acid, acrylic acid esters, methacrylic acid esters (such as alkyl esters) and other acrylic polymers having acrylic monomers as principal copolymer components; and polyvinyl acetate, ethylene-vinyl acetate copolymer (EVA) and other vinyl acetate resins and the like. One or two or more materials selected appropriately from the polymers given as examples of binders in the negative electrode active material layer can also be used as binders for the inorganic particles. In a preferred mode of the porous inorganic layer disclosed herein, the inorganic layer contains an acrylic binder. The inorganic layer may also have a composition containing effectively only an acrylic binder as the binder for the inorganic particles.

The mass ratio of inorganic particles to binder in the porous inorganic layer (inorganic particles: binder) can be about 80:20 to 99:1 for example. The mass ratio is preferably about 85:15 to 95:5. In a preferred embodiment, the total content of inorganic particles and binder as a mass percentage of the porous inorganic layer as a whole is about 90% or more (such as 95% or more). The porous inorganic layer may be composed effectively of only the inorganic particles and binder.

In the techniques disclosed herein, the porous inorganic layer is formed using a slurry containing inorganic particles, a binder and an organic solvent. Typically, the porous inorganic layer can be formed by coating this slurry on the surface of the active material layer, and drying it under appropriate conditions. It can also be heated at a suitable temperature as necessary to promote drying.

About 50 mass % or more (preferably at least 75%, or effectively all) of the constituent solvent in the slurry is preferably a polar organic solvent, and an aprotic polar organic solvent is especially preferred. With a slurry of this solvent composition, the degree seepage of the binder into the active material layer can be adjusted more appropriately using the water on the surface of the active material layer. Examples of aprotic polar organic solvents that can be used include N-methyl-2-pyrrolidone (NMP), N,N-dimethylformamide (DMF), N,N-dimethylacetamide (DMAc) and other cyclic or chain amides. Of these, NMP is preferred. Other examples of aprotic polar organic solvents that can be used in the slurry include tetrahydrofuran (THF), cyclohexanone, 1,4-dioxane and the like. One such aprotic polar organic solvent can be used, or a combination of two or more can be used. In a preferred mode, an aprotic polar organic solvent constitutes at least 75 mass % (preferably about 90 mass % or more) of the solvent contained in the slurry. An aprotic polar organic solvent (such as one or two or more selected from the amide solvents) may constitute effectively all of the solvent.

In addition to the polar organic solvent (preferably aprotic solvent), the slurry may also contain a nonpolar solvent (toluene, xylene or the like) that is compatible with the polar solvent. Normally the mass percentage of the nonpolar organic solvent as a percentage of the solvent component of the slurry is about 25% or less (such as about 10% or less).

The solids concentration (percentage of porous inorganic layer-forming components in the slurry, here sometimes abbreviated as "NV") is not particularly limited but can be about 30 to 80 mass % for example. The viscosity of the slurry at 25° C. can be about 500 to 4000 mPa·s for example, and normally a viscosity of about 1000 to 2000 mPa·s is preferred. The composition of the slurry can be selected so that the viscosity is within this range during use (that is, during coating on the surface of the active material layer). A slurry of this viscosity has good coating properties on the surface of the active material layer, and is useful for adjusting the degree of seepage of the binder into the active material layer using the water on the surface of the active material layer. The viscosity of the slurry can be adjusted for example by adjusting the type of organic solvent, the type and amount of binder, and the NV, pH and the like. The viscosity of the slurry can also be adjusted by adding a well-known thickener. The temperature of the slurry can also be adjusted so that the viscosity is within the aforementioned range during use.

The water concentration Cc of the slurry during use is preferably lower than the water concentration Cs of at least the surface of the active material layer on which the slurry is to, be coated (that is, Cc<Cs). For example, it is desirable to use a slurry with a Cc of about 80 ppm or less (preferably 60 ppm or less). With a slurry of this water concentration, it is possible to use the water on the surface of the active material layer to appropriately adjust the degree of seepage of the binder into the active material layer. The water concentration can be measured by the common Karl Fischer method.

When forming the porous inorganic layer using the techniques disclosed herein, the slurry is coated on the surface of an active material layer in which the water concentration of at least the surface is 100 ppm to 500 ppm. It is thus possible to adjust seepage of the binder inside the active material layer. For example it is possible to achieve a high level of both input output performance (such as a low IV resistance as discussed below) of a battery constructed using an electrode equipped with the porous inorganic layer, and adhesiveness of the inorganic layer with the active material layer. If the water concentration is below the aforementioned range, the IV resistance of the battery may be higher. If the water concentration is above the aforementioned range, the adhesiveness of the porous inorganic layer on the active material layer may decline.

It is not necessary to know why favorable results are obtained when a porous inorganic layer-forming slurry is coated on the surface of an active material layer with a water concentration within the aforementioned range when implementing the techniques disclosed herein, but the following reasons are possible for example.

Figure 6:
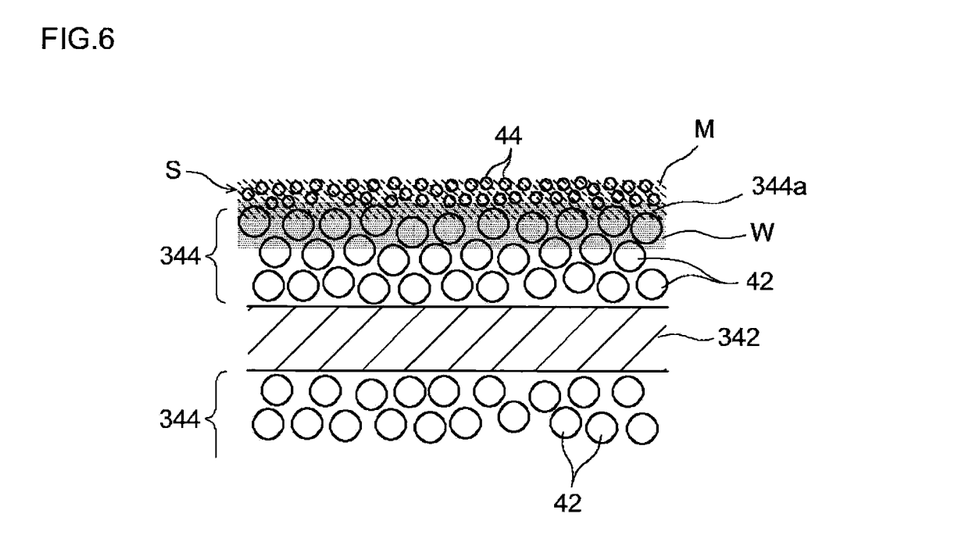
FIG. 6 is an explanatory drawing showing the water content of the surface of the active material layer in an appropriate condition.

The slurry is in the form of inorganic particles dispersed in a liquid medium containing an organic solvent (typically a polar organic solvent) and a binder. Thus, as illustrated in FIG. 6, when porous inorganic layer-forming slurry S is coated on active material layer surface 344*a* containing a suitable amount of water W, water W infiltrates slurry S at the boundary with active material layer 344, reducing the fluidity of the slurry. This reduction in fluidity can be discerned as increased viscosity or gelling of slurry S. This makes it more difficult for slurry S outside the boundary area (above in FIG. 6) to permeate inside active material 344. This serves to prevent excessive seepage of slurry S (especially liquid medium M) inside active material 344. In FIG. 6, the symbol 42 represents active material particles (such as carbon particles), while the symbol 44 represents inorganic particles (such as alumina particles). The hatching represents water W, while the diagonal dotted lines represent liquid medium M.

Figure 7:
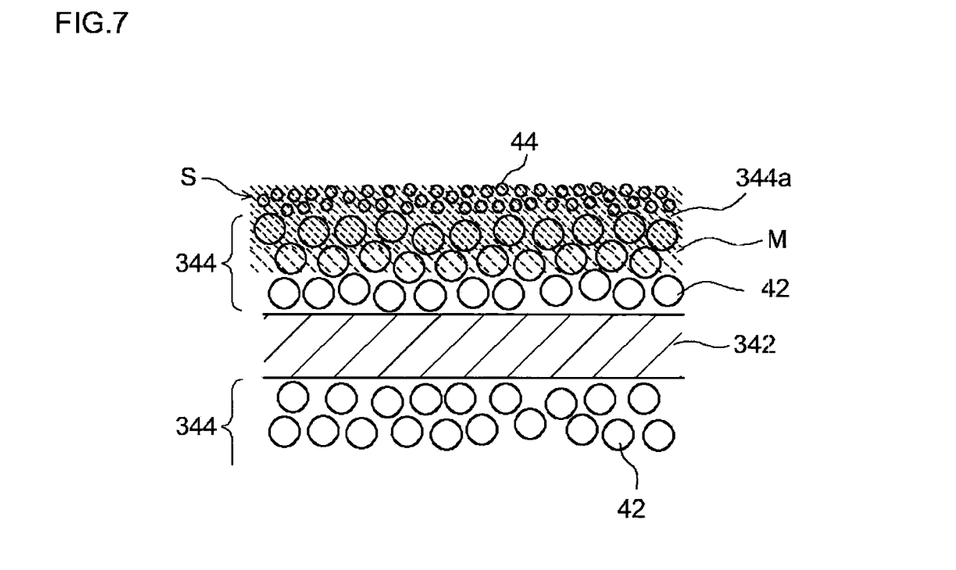
FIG. 7 is an explanatory drawing showing the water content of the surface of the active material layer in an excessively low condition.

Since water inside the battery container is undesirable in a nonaqueous secondary battery, it is desirable to minimize the amount of adsorbed water on the components in the container when constructing the battery. In particular, an electrode having a porous structural part (such as an active material layer) can be a major source of water intrusion inside the case. It has therefore been the custom to perform the various processes of battery manufacture in a highly dry environment (such as an environment of dewpoint about $-30°$ C. to $-50°$ C.). However, as illustrated in FIG. 7, when slurry S is applied to the surface of an active material layer 344 that is in a highly dried state (typically, with a moisture concentration of about 50 ppm or less), the liquid medium M including the binder can easily seep into the inside of active material layer 344 and film a film of binder on the surface of active material particles 42 on the inside of active material layer 344—something that does not occur under the conditions shown in FIG. 6. This is thought to be one cause of reduced input-output performance.

Figure 8:
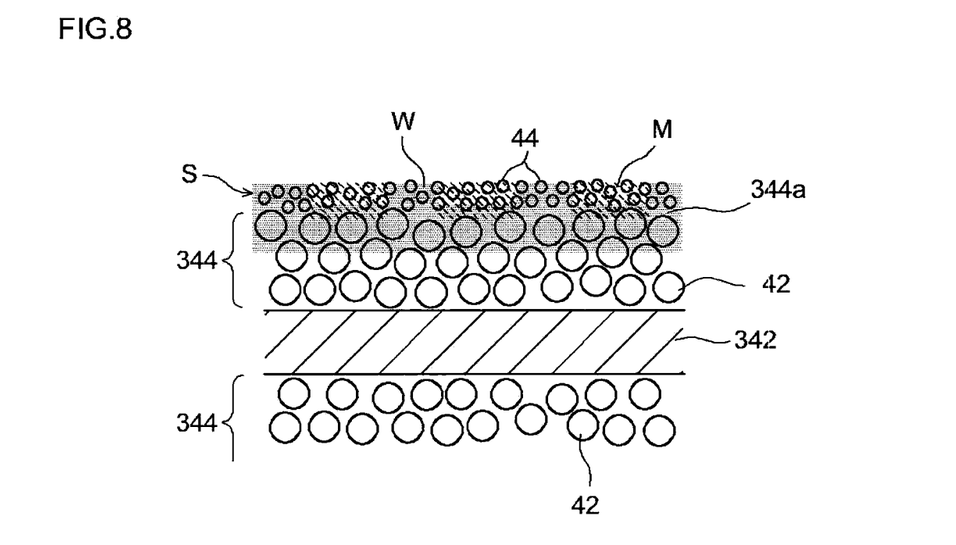
FIG. 8 is an explanatory drawing showing the water content of the surface of the active material layer in an excessively high condition.

As illustrated in FIG. 8, however, if the water concentration of the surface of the active material layer is too far above the aforementioned range, the fluidity will decline before slurry S can settle on surface 344*a* of the active material layer, making it difficult for slurry S to be coated thinly and uniformly, and potentially causing irregular distribution of liquid medium M (especially the binder) in the coat. When the binder is irregularly distributed, there will be areas with less binder (and less adhesiveness), and the porous inorganic layer will be more likely to peel off surface 344*a* of the active material layer. Such peeling can detract from the object of forming the inorganic layer. With the techniques disclosed herein, an electrode that can be used to construct a highly reliable, high-performance battery (with low IV resistance for example) can be manufactured by keeping the water content of the active material layer surface within the aforementioned preferred range.

The aforementioned phenomenon in which water on the surface of the active material layer reduces the fluidity of the slurry can also be useful for preventing excessive precipitation of inorganic particles into gaps in the active material layer (gaps between active material particles). In the case of an active material layer with a relatively high void ratio (such as a void ratio of about 30 to 50 vol % for example) in particular, the porous inorganic layer may be unable to adequately fulfill its function (preventing internal short-circuits) due to excessive precipitation of inorganic particles into the voids. The input-output performance will tend to decline if the coated amount (as NV) of the slurry is increased in order to compensate for precipitation of inorganic particles. With the techniques disclosed herein, these problems are averted by appropriately preventing precipitation of the inorganic particles.

One preferred method for adjusting the water concentration of the active material layer surface is to prepare an electrode preform provided with an active material layer having a water concentration lower than the target value at least on the surface (typically on both the surface and inside), and then retain this preform in an environment with water (such as an environment of dewpoint $-10°$ C. or more, or typically $-10°$ C. to $+10°$ C.). At least the surface of the active material layer having the aforementioned low water concentration can be made to contain water (humidified) to the target water concentration by adjusting the time during which it is retained in this environment. The retention time can be determined by measuring the water concentration of a sample taken from the actual active material layer, or can be estimated appropriately based on simple preliminary experiments or the like.

The surface part of the active material layer can also be treated to increase hydrophilicity prior to adjusting the water concentration. For example, treatment to introduce hydrophilic functional groups on the surface of active material particles located in the surface part can be adopted by preference. Examples of such hydrophilic functional groups include hydroxyl, carboxyl, aldehyde and other polar functional groups containing oxygen (O), and hydroxyl and carboxyl groups are preferred examples. Hydroxyl groups are especially preferred. For example, hydrophilic functional groups (typically, mainly hydroxyl groups) can be introduced on the surface of active material particles located in the surface part of the active material layer by supplying (by spraying, dipping or the like) a lower alcohol to the surface of the active material layer. A $C_{1-3}$ alkyl alcohol can be used by preference as this lower alcohol. Normally, methanol and/or ethanol are preferred. The water content on the surface of the active material layer can be locally increased by adjusting the water content (in an environment of the aforementioned dewpoint for example) after performing such hydrophilicity treatment. By applying a coating agent with the water content thus preferentially distributed on the surface of the active material layer, it is possible to reduce the amount of water retained in the active material layer as a whole (to about $\frac{1}{10}$ to $\frac{1}{100}$ of that without treatment) while effectively preventing excessive seepage of the binder. Because the surface of carbon particles are ordinarily hydrophobic, hydrophilicity treatment is particularly effective in a mode using carbon particles (such as graphite particles) as the active material particles.

In the techniques disclosed herein, the average diameter of the pores (gaps) in the porous inorganic layer and the volume of the pores as a percentage of the total volume of the inorganic layer (porosity) and the like are not particularly limited, but can be set so as to achieve the objects of forming the inorganic layer (improving battery reliability, or more specifically preventing internal short-circuits and the like), and ensure the desired battery characteristics. For example, a desirable range of pore diameters is about 0.01 μm to 10 μm (preferably about 0.1 μm to 4 μm), and a desirable range of porosity is about 20 to 75 vol % (preferably 35 to 70 vol %). The average pore diameter and porosity can be measured using a commercial mercury porosimeter or the like.

Figure 1:
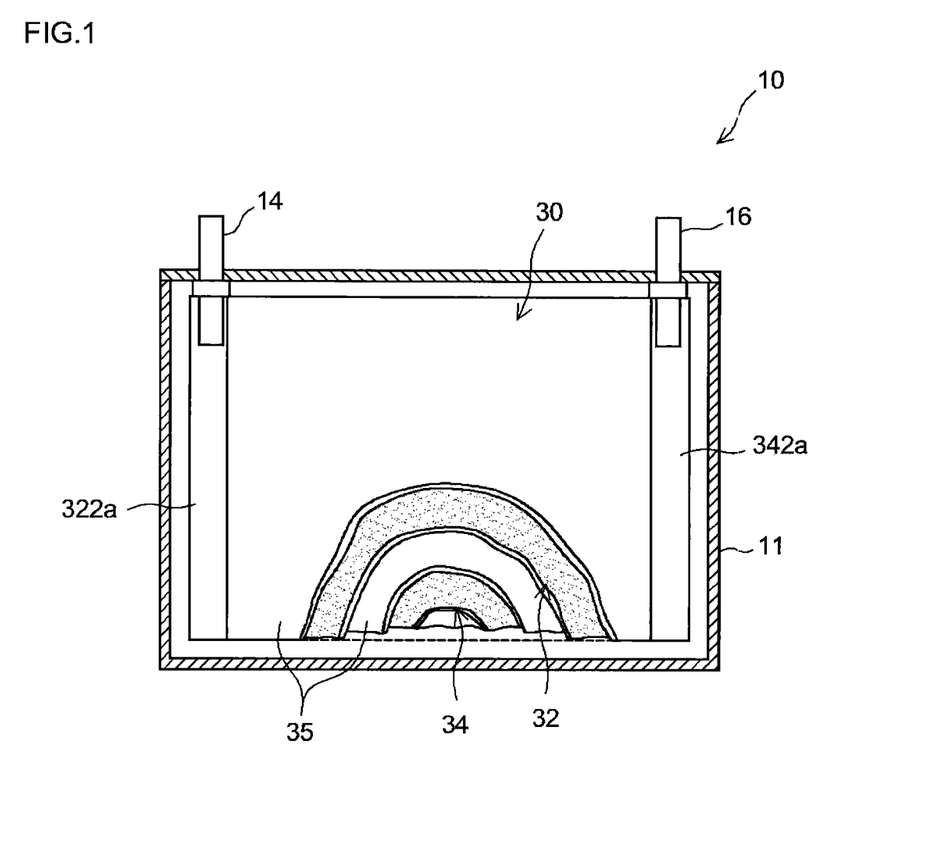
FIG. 1 is a model cross-section showing the structure of a lithium-ion battery of one embodiment.

One embodiment of a lithium-ion battery using the nonaqueous secondary battery electrode provided by the techniques disclosed herein as a negative electrode is explained here with reference to the drawings. As shown in FIG. 1, lithium-ion battery 10 of this embodiment is provided with metal container 11 (although resin or laminate film containers are also suitable). This container 11 contains wound electrode body 30, which is configured with positive electrode sheet 32, negative electrode sheet 34 and two separators 35 laminated and wound together (wound flat in this embodiment).

Figure 2:
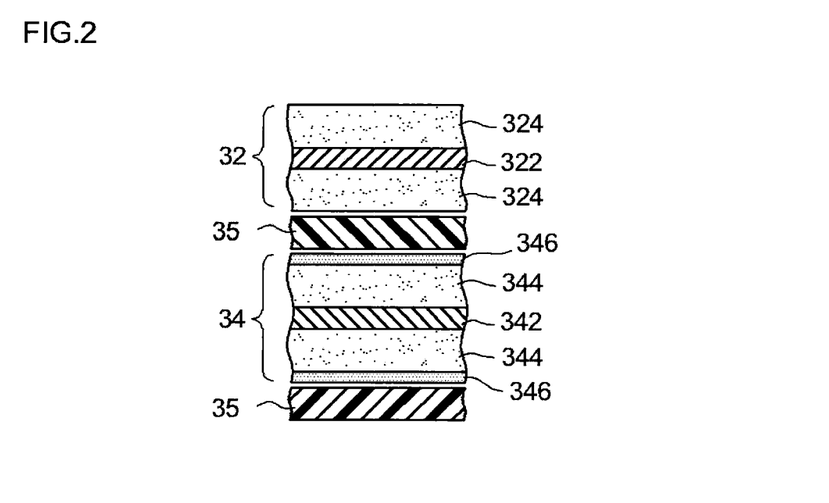
FIG. 2 is a model cross-section showing the positive and negative electrode sheets and separators making up a lithium-ion battery of one embodiment.

As shown in FIG. 2, positive electrode sheet 32 is provided with positive electrode collector 322 in the form of a long thin sheet, and positive electrode active material layers 324 formed on the surface of both sides of the collector. A sheet of aluminum, nickel, titanium or another metal (typically a metal foil, such as an aluminum foil, about 5 µm to 30 µm thick) can be used as positive electrode collector 322. Positive electrode active material layers 324 consist primarily of a positive electrode active material capable of storing and releasing lithium ions. An oxide positive electrode active material with a laminar structure or an oxide positive electrode active material with a spinel structure or the like used in ordinary lithium-ion batteries can be used favorably for the positive electrode active material. For example, a positive electrode active material consisting primarily of a lithium-cobalt composite oxide (typically $LiCoO_2$), lithium-nickel composite oxide (typically $LiNiO_2$), lithium-manganese composite oxide ($LiMn_2O_4$) or the like can be used.

Positive electrode active material layer 324 can contain a binder and conductive material in addition to the positive electrode active material. A binder similar to the binder in the negative electrode active material composition above can be used as the binder. Various forms of carbon black (acetylene black, furnace black, Ketjen black, etc.), graphite powder and other carbon powders, and nickel powder and other metal powders and the like can be used as the conductive material. The amount of conductive material used per 100 parts by mass of the positive electrode active material is not particularly limited, but can be in the range of 1 to 20 parts by mass (preferably 5 to 15 parts by mass). The amount of binder used per 100 parts by mass of the positive electrode active material can be 0.5 to 10 parts by mass for example.

When forming positive electrode active material layers 324, a positive electrode active material layer-forming material (here, a positive electrode composite paste of the water-kneaded type), typically prepared by mixing a suitable positive electrode active material such as those described above with a conductive material, a binder and water (such as ion-exchange water), is coated on the surface of both sides of positive electrode collector 322, and the coated material is dried at a suitable temperature range (typically 70 to 150° C.) that does not cause denaturing of the active material. Positive electrode active material layers 324 can be formed in this way at the desired sites (corresponding to the area of application of the positive electrode active material composition) on the surface of both sides of positive electrode collector 322. These can then be pressed (by roll pressing for example) as necessary to appropriately adjust the thickness and density of positive electrode active material layers 324.

Figure 3:
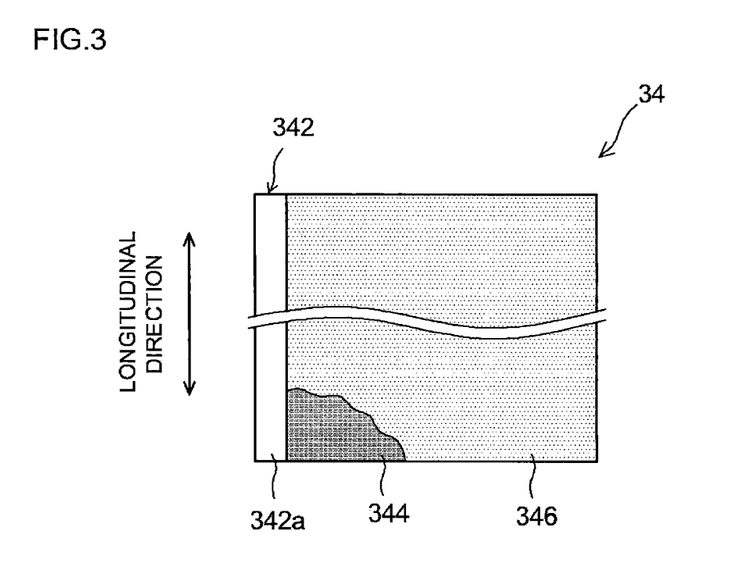
FIG. 3 is a model cross-section showing the structure of an electrode of one embodiment.

Negative electrode sheet 34, which is manufactured by applying the methods disclosed herein, is provided with negative electrode collector 342 in the form of a long thin sheet, negative electrode active material layers 344 formed on the surface of the collector, and porous inorganic layers 346 formed on the negative electrode active material layers (FIGS. 2 and 3). As in the case of the positive electrode, negative electrode active material layers 344 are obtained by applying a suitable negative electrode active material composition as described above to the surface of both sides of negative electrode collector 342, drying the composition at a suitable temperature and adjusting the density as necessary (by roll pressing for example).

Porous inorganic layers 346 are formed by coating a suitable slurry as described above on negative electrode active material layers 344, at least the surfaces of which have been adjusted to a water concentration of 100 ppm to 500 ppm, and drying the coat at a suitable temperature. In this embodiment, porous inorganic layers 346 are formed so as to cover all of negative electrode active material layers 344. To facilitate understanding of the present invention, part of porous inorganic layer 346 has been omitted in FIG. 3 at one end (the lower left in the figure) in the lengthwise direction of negative electrode sheet 34, exposing negative electrode active material layer 344 underneath.

A sheet 34 the water content of which has been sufficiently reduced after formation of porous inorganic layer 346 is preferably used as negative electrode sheet 34. It is thus possible to reduce the amount of water introduced into the battery container in association with sheet 34. For example, it is desirable to use a negative electrode sheet 34 in which the water concentration, averaged for active material layer 344 and inorganic layer 346 as a whole, is adjusted to 200 ppm or less (preferably 100 ppm or less, such as 80 ppm or less).

Various kinds of porous sheets known to be usable as separators for lithium-ion batteries having nonaqueous electrolytes can be used as separators 35 overlaid with positive electrode sheet 32 and negative electrode sheet 34. For example, porous resin sheets (films) made of a polyolefin resin such as polyethylene or polypropylene can be used by preference. The properties of a preferred porous sheet (typically a porous resin sheet) are not particularly limited, but one example is a porous resin sheet with an average pore size of about 0.0005 µm to 30 µm (preferably 0.001 µm to 15 µm) and a thickness of about 5 µm to 100 µm (preferably about 10 µm to 30 µm). The porosity of this porous sheet may be about 20 to 90 vol % (preferably about 30 to 80 vol %) for example.

As shown in FIG. 1, one edge of positive electrode sheet 32 extending in the lengthwise direction is provided with a part lacking positive electrode active material layer 324 (active material layer-free part 322a). Similarly, one edge of negative electrode sheet 34 extending in the lengthwise direction is provided with a part lacking negative electrode active material layer 344 and porous inorganic layer 346 (active material layer-free part 342a). When positive and negative electrode sheets 32 and 34 are layered with two separators 35, the two electrode sheets 32 and 34 are offset somewhat so that the two active material layers 324 and 344 overlap each other while active material layer-free part 322a of the positive electrode sheet and active material layer-free part 342a of the negative electrode sheet are positioned separately on opposite edges extending in the lengthwise direction. Flat wound electrode body 30 is obtained by winding the four sheets 32, 35, 34 and 35 in this arrangement, and then squashing the wound body from the side.

Next, the resulting wound electrode body 30 is connected electrically to positive electrode terminal 14 and negative electrode terminal 16 for external connection. Electrode body 30 connected to terminals 14 and 16 is then contained in container 11, and a suitable nonaqueous electrolyte solution is supplied (injected) into container 11, which is then sealed. This completes construction (assembly) of lithium-ion battery 10 of this embodiment. Lithium-ion battery 10 can then be obtained by performing suitable conditioning treatment (such as 3 hours of constant current charge at a rate of 1/10 C, followed by 2 to 3 repetitions of initial charge-discharge consisting of constant-current, constant-voltage charging to 4.1 V at a rate of 1/3 C and constant-current discharging to 3.0 V at a rate of 1/3 C). The nonaqueous electrolyte can be similar to those used in ordinary lithium-ion batteries. For example, it is desirable to use a nonaqueous electrolyte consisting of $LiPF_6$ or another lithium salt (supporting salt) contained at a concentration of about 0.1 mol/L to 5 mol/L (such as about 0.8 mol/L to 1.5 mol/L) in a mixed solvent consisting of a suitable combination of carbonates such as ethylene carbonate (EC), propylene carbonate (PC), diethyl carbonate (DEC), dimethyl carbonate (DMC), ethylmethyl carbonate (EMC) and the like.

Figure 9:
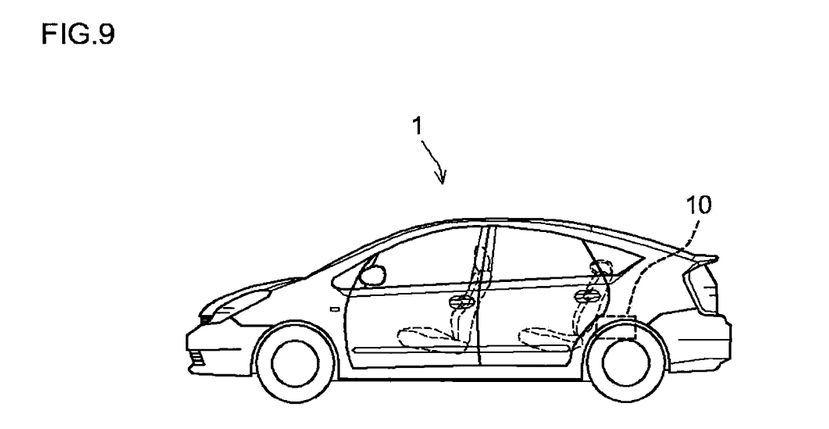
FIG. 9 is a side view of a vehicle (automobile) equipped with the lithium-ion battery of one embodiment.

With the lithium-ion battery provided by the techniques disclosed herein, it is possible to prevent micro-short circuits to a high degree as described above and achieve superior reliability and excellent input-output performance. The battery is especially suitable as a power source for motors mounted in automobiles and other vehicles. Thus, as shown in FIG. 9, the present invention provides vehicle 1 (typically an automobile, especially a hybrid automobile, electrical automobile, fuel cell automobile or other automobile provided with a motor) having any of the lithium-ion batteries 10 disclosed herein (which may be in the form of a battery assembly of multiple batteries 10 connected in a series) as a power source.

Certain examples of the present invention are explained below, but this does not mean that the present invention is limited to these specific examples.

EXAMPLE 1

[Preparation of Negative Electrode Sheet]

Natural graphite with an average particle size of 10 μm (negative electrode active material), SBR and CMC in a ratio of 98:1:1 were mixed with ion-exchange water to prepare a negative electrode active material composition in slurry form. This composition was coated on the surface of both sides of a strip of copper foil 10 μm thick, 80 mm wide and 5000 mm long, to a total coating amount (as NV) of 8.6 mg/cm$^2$ on both sides. The area of application of the negative electrode active material excluded a 15 mm band on the edge of the copper foil, extending in the lengthwise direction on both sides. The coated material was dried, and then pressed to a density of 1.4 g/cm$^3$ of the negative electrode active material layer. A negative electrode preform comprising negative electrode active material layers on the surface of a negative electrode collector was obtained in this way.

Pressing was performed in an environment of dewpoint −30° C. or less. In this same environment, the surface of the active material layer was scraped off one part of the negative electrode active material layer on the preform immediately after pressing, and the water content of this sample was measured by the Karl Fischer method. The water concentration of the surface of the negative electrode active material layer (that is, the negative electrode active material layer before water concentration adjustment treatment) was thereby shown to be about 175 ppm.

The negative electrode preform thus prepared was then treated to adjust the water concentration. That is, the negative electrode preform was transferred to an environment of dewpoint −5° C., and retained in this environment to cause adsorption of water by the negative electrode active material layer. 8 negative electrode preform samples with different water concentrations were prepared by adjusting the retention time. The water concentrations of the surfaces of the negative electrode active material layers of each sample were determined by the same Karl Fischer method used above, with the results shown in Table 1.

α-alumina particles with an average particle size of 0.8 μm and an acrylic binder were mixed with NMP to a mass ratio of 90:10 of the two materials and a NV of 50 mass %, to prepare a slurry-type coating agent. This coating agent was coated on the surface of the negative electrode active material layers formed on both sides of the negative electrode preform sample above, to a total coating amount (as NV) of 6.5 mg/cm$^2$ on both sides, and dried to form porous inorganic layers. 8 different negative electrode sheet samples (Samples Nos. 1 to 8) corresponding to the respective negative electrode preform samples were obtained in this way.

[Preparation of Lithium-ion Battery]

Following the procedures below, the negative electrode samples thus obtained were used to prepare lithium-ion batteries 10 having the general configuration shown in FIGS. 1 through 4.

The following were used for the positive electrode sheets. Lithium nickelate (LiNiO$_2$) powder, acetylene black, PTFE and CMC were mixed with ion-exchange water to a mass ratio of 89:5:5:1 of the four materials, to prepare a slurry-type positive electrode active material composition. This composition was coated on both sides of a strip of aluminum foil 10 μm thick, 80 mm wide and 5000 mm long, to a total coating amount (as NV) of 10 mg/cm$^2$ on both sides. The area coated with the positive electrode active material composition excluded a 17 mm-wide band on one edge of the aluminum foil, extending on both sides in the lengthwise direction. The coated material was dried and pressed to obtain a positive electrode sheet.

The negative electrode sheet samples and positive electrode sheets prepared above were layered with two separators (here using porous polypropylene 30 μm thick, 80 mm wide and 5000 mm long). The two electrode sheets were offset somewhat so that the positive electrode active material layer-free part (aforementioned band on the positive electrode sheet) and negative electrode active material layer-free part (aforementioned band on the negative electrode sheet) were on opposite edges in the direction of width. This layered sheet was wound about 30 times in the lengthwise direction, and the wound body was squashed from the side to form a flat electrode body.

An aluminum positive electrode terminal and copper negative electrode terminal were welded, respectively, to the positive electrode active material-free part and negative electrode active material-free part protruding from the separators at both ends of the electrode body in the axial direction. This was enclosed in a flat, oblong container together with a nonaqueous electrolyte solution, and the opening of the container was sealed to construct a lithium-ion battery. 50 mL per battery of a nonaqueous electrolyte solution composed of a supporting salt (LiPF$_6$ here) dissolved at a concentration of 1 mol/L in a mixed solvent of EC, DMC and EMC (volume ratio 1:1:1) was used as the nonaqueous electrolyte solution. 8 lithium-ion batteries corresponding to the negative electrode sheet samples were obtained in this way.

[90° Peeling Strength Measurement]

The 90° peeling strength of the porous inorganic layers of each of the negative electrode sheet samples prepared above was measured. A tensile tester with the general configuration shown in FIG. 4 was used for measurement. This tensile tester 80 is provided with base 81 on which test piece 92 is fixed by taping, chuck 83 clamped to one end of test piece 92 in the lengthwise direction, arm 84 supporting chuck 83, and load measuring device 85 attached to arm 84. One end of wire 86, which is threaded through pulleys 872 and 874, is fixed on arm 84. Weight 88 (here a weight with a mass of 400 g) is suspended from the other end of wire 86. Test piece 92 is peeled at a peel angle of 90° when one end of test piece 92 is clamped and pulled up by chuck 83.

Figure 4:
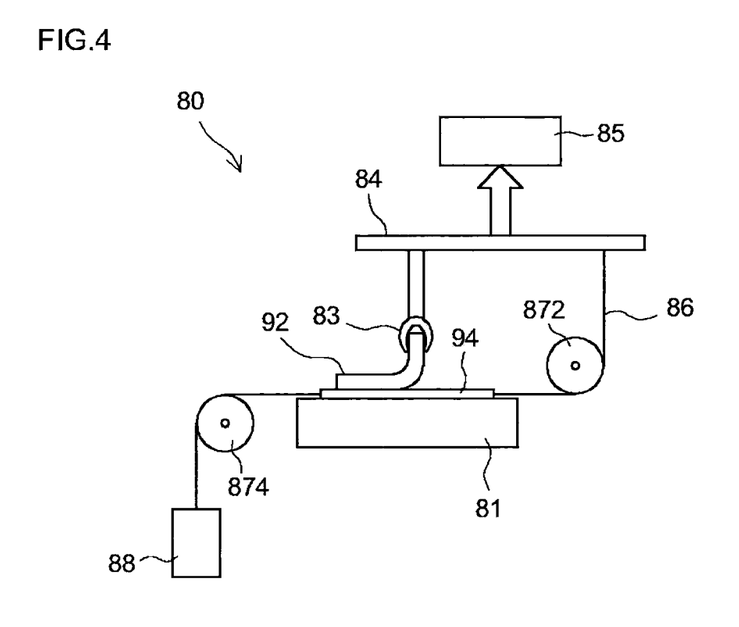
FIG. 4 is an explanatory drawing showing a method for measuring peeling strength.

The negative electrode sheet sample (part without active material layer-free part) was cut into a 15 mm-wide band to prepare test piece 92. This test piece 92 was taped to base 81 using 15 mm-wide, 100 mm-long double-sided tape 94. One end of test piece 92 was left untaped, and this untaped part was set in chuck 83. Arm 84 was then pulled up at a pull rate of 10 mm/minute to peel the negative electrode active material layer from the porous inorganic layer, leaving the inorganic layer on the double-sided tape. The load value at the instant of peeling was then given as the 90° peeling strength of the porous inorganic layer.

[IV Resistance Measurement]

The IV resistance of the lithium-ion batteries prepared above was measured. Each of the lithium-ion batteries prepared above was pre-charged at constant current, constant voltage (CCCV) to 3.5 V at 5 A. The total charge time was 1 hour. The state of charge (SOC) of each battery was thus adjusted to 60%. This was followed by constant current (CC) discharge for 10 seconds at 60 A, and the internal resistance (IV resistance) was determined from the slope of the primary approximation line of current (I)-voltage (V) values.

Figure 5:
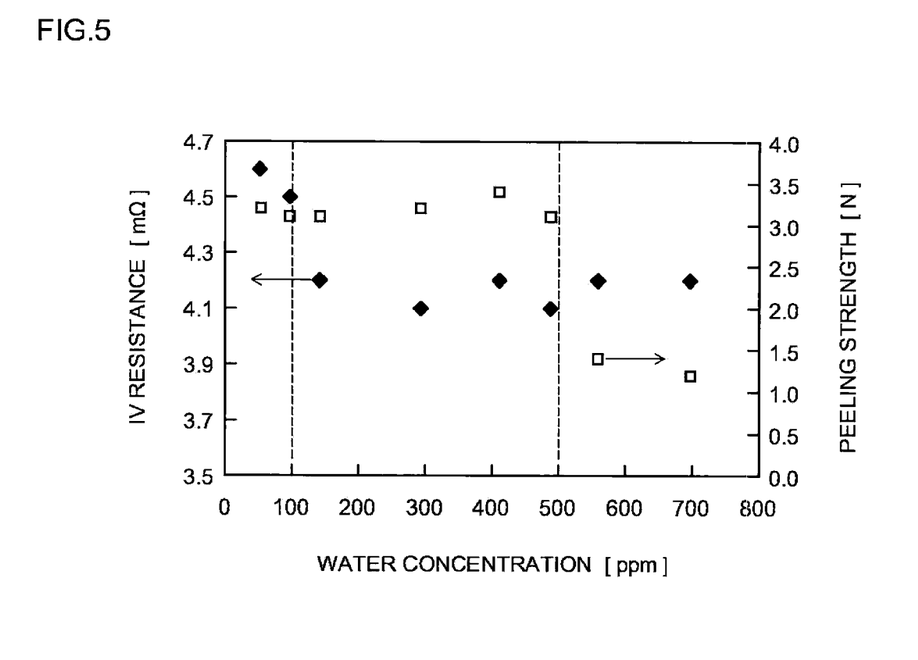
FIG. 5 is a graph showing the relationship between water content and IV resistance and peeling strength.

The measurement results for peeling strength and IV resistance are shown in Table 1 and FIG. 5 in relation to the water concentrations of the active material layer surfaces at the time of slurry application.

TABLE 1

| Sample No. | Water concentration [ppm] | IV resistance [mΩ] | Peeling strength [N] |
| --- | --- | --- | --- |
| 1 | 52 | 4.6 | 3.2 |
| 2 | 97 | 4.5 | 3.1 |
| 3 | 142 | 4.2 | 3.1 |
| 4 | 293 | 4.1 | 3.2 |
| 5 | 411 | 4.2 | 3.4 |
| 6 | 488 | 4.1 | 3.1 |
| 7 | 559 | 4.2 | 1.4 |
| 8 | 697 | 4.2 | 1.2 |

As shown in the Figure and Table, Samples Nos. 3 through 6 having a coating agent coated on an active material layer surface with a water concentration in the range of 100 ppm to 500 ppm had high peeling strength of the porous inorganic layer and low internal resistance of the battery. These results illustrate the good input-output characteristics of the batteries of Samples Nos. 3 through 6, and also show that the porous inorganic layer can have good durability (for example, resistance to peeling from the active material surface even if the volume of the active material layer fluctuates due to charge and discharge).

EXAMPLE 2

Ethanol (total amount used 5 mL) was sprayed on the entire surface of a negative electrode preform prepared as in Example 1. This negative electrode preform was then transferred to an environment of dewpoint −5° C., and retained in that environment until the water concentration of the active material layer surface (as measured by the Karl Fischer method) was 155 ppm. The water concentration of the inside of the active material layer was about 50 ppm. A slurry-type coating agent similar to that of Example 1 was coated on this negative electrode preform sample with a surface water concentration of 155 ppm, and dried to form a porous inorganic layer. A lithium-ion battery (Sample No. 9) was prepared as in Example 1 using this negative electrode sheet sample as the negative electrode.

The lithium-ion battery of this Sample No. 9 and the lithium battery of Sample No. 3 prepared in Example 1 were pre-charged at constant-current, constant-voltage (CCCV) to 3.5 V at 5 A. The total charge time was 1 hour. The needle tip of a Bourdon tube pressure gauge was inserted into the battery container, and the internal pressure of the battery was measured. The results are shown in Table 2.

TABLE 2

| Sample No. | Water concentration [ppm] | Internal pressure [MPa] |
| --- | --- | --- |
| 9 | 155 | 0.13 |
| 3 | 142 | 0.19 |

As shown in this table, the battery of Sample No. 9, which was manufactured with alcohol treatment (hydrophilic functional group introduction treatment), had a smaller rise in internal pressure than the battery of Sample No. 3, which had roughly the same surface water concentration and was manufactured under the same conditions but without the aforementioned treatment. That is, less gas was generated by pre-charging in the case of Sample No. 9. These results suggest that the alcohol treatment reduced the amount of water introduced into the container in association with the negative electrode sheet.

The present invention was explained in detail above, but the aforementioned embodiments are only examples, and the invention disclosed herein encompasses a variety of alterations and modifications to these specific examples.

The invention claimed is:

1. A method for manufacturing a nonaqueous secondary battery negative electrode having a porous inorganic layer on a negative electrode active material layer, the method comprising the following steps performed in the sequence set forth:

preparing a negative electrode preform that has a negative electrode active material layer consisting primarily of negative electrode active material particles and supported on a collector, wherein the negative electrode active material layer is prepared by applying a liquid composition containing the negative electrode active material particles dispersed in a water-based solvent to the collector, and drying the liquid composition;

adjusting a water concentration of the negative electrode active material layer so that a water concentration of at least the surface of the negative electrode active material layer is 100 ppm to 500 ppm, wherein the adjustment of the water concentration of the negative electrode active material layer is performed separately from the preparation of the negative electrode preform; and coating a slurry containing inorganic particles, a binder and an organic solvent on the surface of the negative electrode active material layer with the water concentration thus adjusted, to form a porous inorganic layer.

2. The method according to claim 1, wherein the organic solvent is an amide solvent.

3. The method according to claim 2, wherein the amide solvent is N-methyl-2-pyrrolidone.

4. The method according to claim 1, wherein the binder is an acrylic binder.

5. The method according to claim 1, wherein the inorganic particles are alumina particles.

6. The method according to claim 1, wherein the negative electrode active material particles are carbon particles.

7. The method according to claim 1, wherein treatment to introduce hydrophilic functional groups on the surface of the negative electrode active material particles located in a surface part of the negative electrode active material layer is performed prior to the adjustment of the water concentration.

8. The method according to claim 7, wherein the treatment to introduce hydrophilic functional groups comprises bringing a lower alcohol into contact with the surface part of the negative electrode active material layer.

9. The method according to claim 1, wherein the adjustment of the water concentration of the negative electrode active material layer comprises retaining the negative electrode active material layer in an environment having dew point of −10° C. or more.

10. A method for manufacturing a lithium-ion battery, comprising constructing a lithium-ion battery using a negative electrode manufactured by the method according to claim 1.

11. A vehicle equipped with a lithium-ion battery manufactured by the method according to claim 10.

12. The method according to claim 1, further comprising performing a treatment to introduce hydrophilic functional groups on the surface of the negative electrode active material particles located in a surface part of the negative electrode active material layer prior to the adjustment of the water concentration, but after the preparation of the negative electrode preform.

13. The method according to claim 1, further comprising spraying a lower alcohol to a surface part of the negative electrode active material layer prior to the adjustment of the water concentration.

14. The method according to claim 1, further comprising dipping a lower alcohol to a surface part of the negative electrode active material layer prior to the adjustment of the water concentration.

15. A method for manufacturing a nonaqueous secondary battery negative electrode having a porous inorganic layer on a negative electrode active material layer, comprising the following steps performed in the sequence set forth:

preparing a negative electrode preform that has a negative electrode active material layer consisting primarily of negative electrode active material particles and supported on a collector, wherein the negative electrode active material layer is prepared by applying a liquid composition containing the negative electrode active material particles dispersed in a water-based solvent to the collector, and drying the liquid composition;

performing a treatment to introduce hydrophilic functional groups on the surface of the negative electrode active material particles located in a surface part of the negative electrode active material layer after the preparation of the negative electrode preform, adjusting a water concentration of the negative electrode active material layer so that a water concentration of at least the surface of the negative electrode active material layer is 100 ppm to 500 ppm, wherein the adjustment of the water concentration of the negative electrode active material layer is performed separately from the preparation of the negative electrode preform; and coating a slurry containing inorganic particles, a binder and an organic solvent on the surface of the negative electrode active material layer with the water concentration thus adjusted, to form a porous inorganic layer.

16. The method according to claim 15, wherein the treatment to introduce hydrophilic functional groups comprises bringing a lower alcohol into contact with the surface part of the negative electrode active material layer.

17. The method according to claim 1, wherein the preparation of the negative electrode preform is performed under an environment having dew point of −30° C. or lower, and the adjustment of the water concentration of the negative electrode active material layer comprises retaining the negative electrode active material layer in an environment having dew point of −10° C. or more.

18. The method according to claim 1, wherein the adjustment of the water concentration of the negative electrode active material layer comprises retaining the negative electrode active material layer in an environment having dew point from −10° C. to +10° C.

19. The method according to claim 1, wherein the adjustment of the water concentration of the negative electrode active material layer is performed such that the water concentration of the surface of the negative electrode active material layer is within a range from 142 ppm to 488 ppm.

* * * * *